April 22, 1952 — J. ASKIN — 2,594,113

FLUID FLOW SIGHT GLASS

Filed Jan. 21, 1949 — 2 SHEETS—SHEET 1

Inventor:
Joseph Askin,
By Schroeder, Merriam,
Wynn & Brady, Attys.

April 22, 1952  J. ASKIN  2,594,113
FLUID FLOW SIGHT GLASS
Filed Jan. 21, 1949  2 SHEETS—SHEET 2
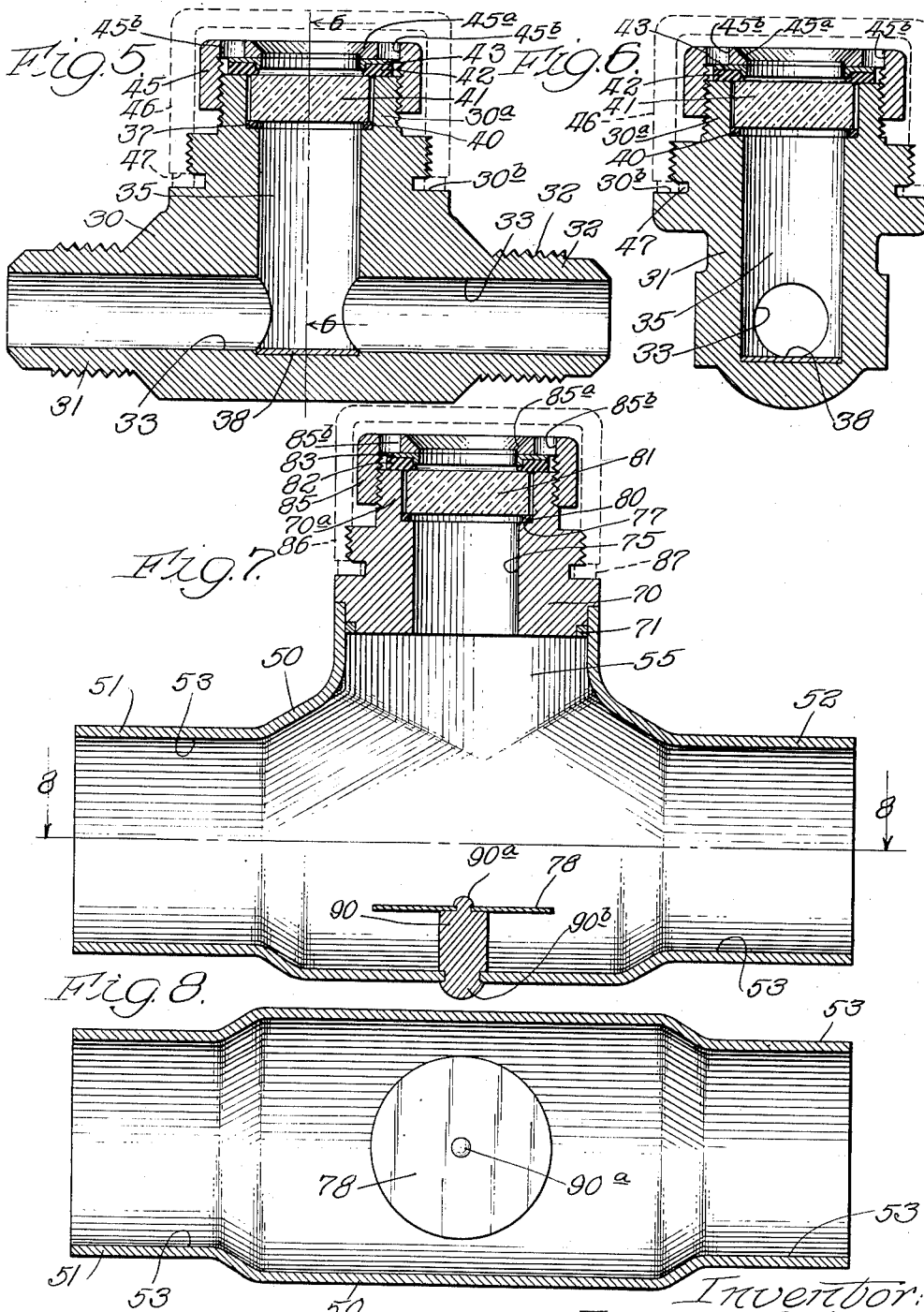
Inventor:
Joseph Askin,
By Schroeder, Merriam,
Hofgren & Brady, Att'ys Patented Apr. 22, 1952

2,594,113

UNITED STATES PATENT OFFICE 2,594,113

FLUID FLOW SIGHT GLASS

Joseph Askin, Chicago, Ill., assignor, by mesne assignments, to Electrimatic Company, a corporation of Illinois Application January 21, 1949, Serial No. 71,912

15 Claims. (Cl. 116—117)

1

This invention relates to a sight glass, and more particularly to a sight glass unit having a transparent window member and a highly reflective polished surface facing said window-member.

One feature of this invention is that it provides an improved sight glass unit particularly adapted for use in the refrigerant line of a commercial refrigeration system, for example; another feature of the invention is that it provides a sight glass unit having a transparent window-member and having a highly reflective polished surface facing said window-member but spaced therefrom so that at least a portion of the fluid flow in the main fluid passageway passes between the reflective surface and the window-member; a further feature of the invention is that the reflective polished surface may be provided by a piece of plated sheet metal which is preferably plane; an additional feature of the invention is that the flow area beneath the window member is greater than that of the main flow passageway on either side of the window member so that no restriction to fluid flow in the main passageway occurs; still another feature is that an annular closure cap or retainer is provided for sealing the window member and that the closure cap has a substantially non-reflective outer surface; yet a further feature of one form of the invention is that the unit is provided with a sight opening having a shoulder, and the piece of sheet metal providing the highly reflective polished surface may be seated on said shoulder; yet another feature of another form of the invention is that the polished sheet metal piece which provides the reflective surface may be recessed into the body portion of the unit in a wall of the main flow passageway; and still an additional feature of the invention is that said polished sheet metal piece may be supported by a pedestal member of relatively small cross sectional area in the main flow passageway.

Further features and advantages of this invention will be apparent from the following specification and from the drawings in which:

Fig. 5 is a vertical longitudinal sectional view through a modified form of sight glass unit;

Fig. 6 is a vertical transverse sectional view along the line 6—6 of Fig. 5;

2

Fig. 7 is a vertical longitudinal sectional view of another modified form of sight glass unit; and Fig. 8 is a horizontal longitudinal section taken along the line 8—8 of Fig. 7.

In commercial refrigeration systems, as in air conditioning units and the like, it is often desirable to provide means for inspecting the condition of the refrigerant in the refrigerant line to determine whether the refrigerant is in liquid state or whether the refrigerant is vaporizing in which event it will be permeated with bubbles. Efforts have been made in the past to provide a sight glass into the refrigerant line, but all such sight glasses heretofore devised have been subject to certain defects principally due to the difficulties resulting from the location of the refrigerant line in relatively inaccessible places in many cases. Most such lines are located in a separate room apart from the main rooms of occupancy in the building, and these rooms are usually poorly lighted and are not given the usual janitor care because they house machinery. In consequence, proper viewing through a conventional sight glass is difficult because of the poor light and when the surface of the sight glass becomes dirty after a period of use it is almost impossible to view the refrigerant in the line.

Furthermore, refrigerant lines are usually so located that the light is very poor and it is impossible to see the refrigerant through the sight glass window. Efforts have been made to correct this defect by providing oppositely facing windows in the line, but in this event it has been necessary for the operator to hold a flashlight or light bulb on the opposite side of the line from the sighting window, and frequently this is difficult or impossible because of the location of the line and the presence of other lines or other apparatus closely adjacent thereto.

The present invention provides a novel sight glass including cover means for keeping the glass clean, and including a reflective surface so constructed and arranged that the refrigerant in the line can be clearly seen under minimum light conditions.

Figure 1:
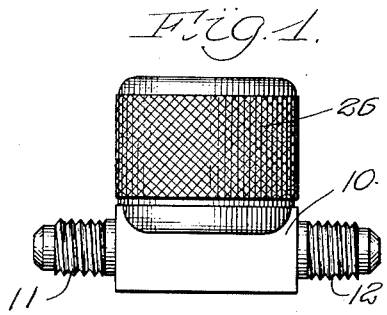
Fig. 1 is a side elevational view of a preferred form of sight glass unit.
Figure 2:
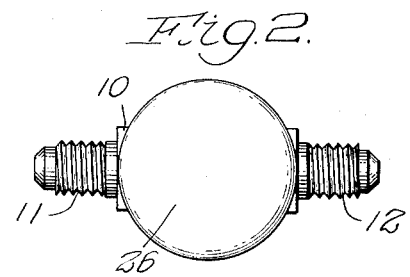
Fig. 2 is a top plan view of the unit of Fig. 1.
Figure 3:
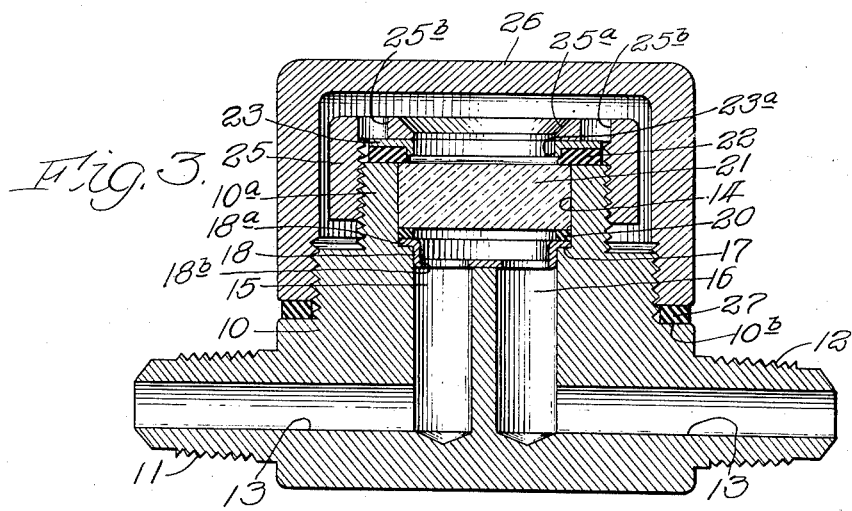
Fig. 3 is an enlarged vertical longitudinal cross sectional view through the unit.

Referring now to the drawings, and more particularly to Figs. 1–4, the sight glass unit includes a body portion 10 having threaded inlet and outlet connecting portions 11 and 12, respectively, and said body portion having a main flow passageway 13 therethrough, this passageway being of substantial cross section as seen in Fig. 3.

A sight opening 14 in the body portion provides a line of view into the interior of the body portion normal to the direction of flow through the main passageway 13, said opening communicating with the main passageway by means of a subsidiary passageway 15 extending from the inlet side of the main passageway 13 and another subsidiary passageway 16 extending from the main passageway 13 on the outlet side. An annular shoulder 17 near the outer end of the sight opening provides a seat for a member 18.

As shown in Fig. 3 the member 18 is formed of sheet metal in the shape of a dish having an annular flange 18a which seats on the shoulder 17. At least the surface of the member 18 which faces outwardly into the sight opening is a highly reflective polished surface. For example, the member 18 may be made of nickel or brass, and may be plated to provide a smoothly polished surface. I prefer that the member 18 be made of sheet brass and be chromium plated and polished to provide a highly reflective finish.

While instead of providing a separate member 18 having a highly polished surface it would be possible to polish a surface of the unit which is integral with other portions of the unit, as for example the bottom of the main passageway, I prefer to use a separate piece because a separate piece of material may be polished to provide a much better reflective surface than may be obtained on the inner bore of a tubular member. Furthermore, I prefer to plate and polish the member 18 before it is stamped into its dish shape since a better reflective finish may be formed on a flat surfaced member, and then the polished member may be stamped into the dish shape shown.

An annular gasket 20 on the flange 18a provides a seat for a transparent window-member 21 comprising a disk of plate glass or similar transparent material. A second annular gasket 22 contacts the other or outer side of the member 21 which is preferably flush with a shoulder at the top of a threaded nipple 10a at the top of the body portion 10.

The members 20 and 22 are preferably formed of a polyvinyl alcohol composition or synthetic rubber which is impervious to the refrigerants found in such systems.

A gasket washer 23 is provided on the second gasket 22, said washer having at least one lip 23a adjacent the periphery of the gasket 22 to limit the expansion of the gasket 22 under sealing pressures. As shown in Fig. 3 the lip is adjacent the inner periphery of the gasket and prevents the gasket from expanding into the sight opening, but obviously the washer 23 might have another lip adjacent the outer periphery of the gasket if desired, and be what might be termed cup-shaped.

An annular closure cap or retainer 25 is threaded on the nipple 10a to seal the unit. This closure cap has a center viewing opening 25a and at least two oppositely disposed openings 25b for the reception of the prongs of a spanner wrench or other tool for tightening and removing the closure cap. The closure cap 25 may be made of brass and preferably has a substantially non-reflective outer surface to facilitate the use of the unit. This surface may be provided by a black enamel coating on the brass closure cap.

A cover cap 26 is threaded on the body portion, being seated on a gasket 27 on an annular shoulder 10b of the body portion. The cap and gasket 27 normaly seal the sight opening from dirt and moisture.

Figure 4:
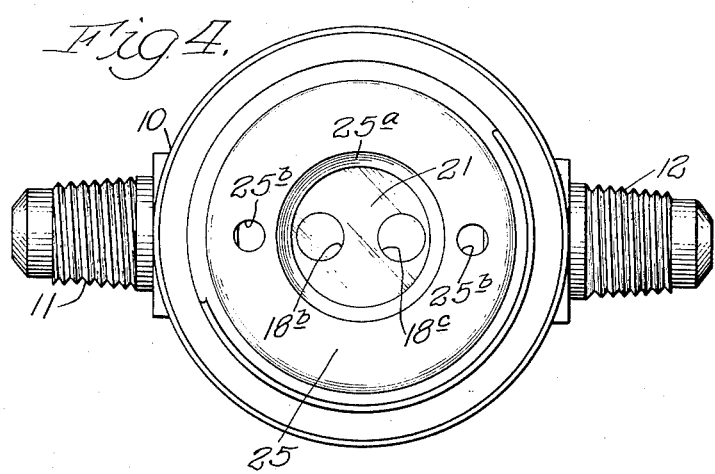
Fig. 4 is an enlarged top plan view with the cover cap removed.

As shown in Figs. 3 and 4 the dish shaped reflecting member 18 has an opening 18b communicating with the auxiliary passage 15 and an opening 18c communicating with the auxiliary passage 16, and the chamber provided in the sight opening by the interior of the dish shaped member 18 provides a flow area beneath the window 21 greater than that of the main passage 13 on either side of the window. It is preferable that the reflecting surface be as close to the glass as possible in order to minimize light losses in the passage of light rays through the refrigerant, but at the same time it is important that the arrangement of the reflecting surface does not interpose any restriction to the flow of the refrigerant. If such a restriction is imposed a false indication of boiling or bubbling of the refrigerant may be given, particularly when the refrigerant is superheated. The provision of a plane reflective polished surface facing the window-member and parallel thereto but spaced therefrom so that at least a portion of the fluid flow through the main passageway passes between the reflective surface and the window-member without restricting the flow of the refrigerant provides an efficient sight glass which will give a true indication of the condition of the refrigerant in the line under minimum light conditions. The reflective surface of the member 18 will throw back any light present, and under conditions where there is almost no light in the room a flashlight or lamp may be held by the operator in a position to provide light without the necessity of having access to the other side of the refrigerant line, and in the preferred embodiment of Figs. 1–4 the polished surface of the member 18 is as close as possible to the window member 21 without restricting the flow of refrigerant.

Referring now more particularly to Figs. 5 and 6 wherein a modification of the unit is disclosed, referance characters 20 higher than those used in Figs. 1–4 will be used to designate similar parts.

Thus the unit comprises a body portion 30 having threaded inlet and outlet nipples 31 and 32 respectively, having a threaded nipple 30a for the reception of a closure cap and having a shoulder 30b for seating a gasket associated with a cover cap.

The main flow passageway 33 communicates with a sight opening provided by an auxiliary passageway 35, and the sight opening has a shoulder 37 near its outer end upon which is seated an annular sealing gasket 40. A transparent window-member 41 seats on the gasket and the sealing arrangement is completed by a second annular gasket 42 engaging the other side of the window-member and being retained in proper position by a gasket washer 43. A closure cap 45 is threaded on the nipple 30a of the body and seals the unit, this cap having a viewing opening 45a therethrough and having oppositely disposed openings 45b for the reception of a spanner wrench or other tool. A cover cap 46 and sealing gasket 47 are shown in broken lines.

In the embodiment of Figs. 5 and 6 a sheet metal piece 38 having a highly reflective polished surface is recessed into the body portion in a wall of the main passageway opposite the sight opening. As shown in Figs. 5 and 6 the polished surface of member 38 faces the window member 41 and is parallel thereto, and inasmuch as the member 38 is recessed into the body 30 it provides substantially no restriction to the flow of refrigerant through the passage 33. The auxiliary passage 35 of the sight opening more than compensates for the very small diminution of area in the main passageway and insures that the flow area beneath the window-member is greater than that of the main passageway on either side of the main window-member.

In Figs. 7 and 8 another modification is shown, this form being particularly adapted for units for use with large refrigerant lines. In large lines of this type threaded nipple joints are not fully satisfactory and all joints are usually silver soldered.

Thus in Figs. 7 and 8 the unit comprises a body portion 50 having respective inlet and outlet connector portions 51 and 52 and being provided with a main flow passage 53 from which extends an auxiliary passage 55 in communication with the sight opening.

A plug 70 is pressed into the open end of the passage 55 and may be secured by silver solder as shown in 71. The plug 70 is similar to the upper portion of the body member of this unit as shown in Figs. 3 and 5 and includes a sight opening having a passage 75 in communication with the passage 55. A shoulder 77 near the outer end of the sight opening provides a seat for a gasket 80 upon which is seated a transparent disk shaped window-member 81. A second annular gasket 82 engages the other side of the window disk 81 and is held in place by a retaining washer 83. A closure cap 85 is threaded on an upper nipple 70a on the member 70 and has a viewing opening 85a and oppositely disposed openings 85b for a spanner wrench or other tool. Shown in broken lines are a cover cap 86 and a sealing washer 87.

Inasmuch as the joints of such a unit are soldered, and inasmuch as such solder is usually applied by means of torch, it is not feasible to mount a member having a highly polished reflective surface in the manner shown in either of Figs. 1-4 or 5, 6 because the high temperatures generated by the torch and conducted through the material of the body portion of the unit would damage the highly polished reflector surface.

In the embodiment of Figs. 7 and 8 a reflector member 78, which may comprise a disk of plated sheet metal, as a chormium plated disk of sheet brass, is supported by a pedestal member 90 of relatively small cross-section. The opposite ends of the pedestal member are provided with rivet heads 90a and 90b. The reflector member 78 is secured on one end of the pedestal by means of the head 90a and the pedestal itself is secured in an opening in the body 50 by means of the rivet head 90b, this opening preferably then being sealed against leakage by soldering.

In this embodiment heat damage in making connections is avoided since the small cross-sectional area of the pedestal cannot conduct enough heat to cause damage to the polished surface of the member 78. At the same time it provides the desired arrangement of a highly reflective polished plane surface facing the window member and parallel thereto but spaced therefrom so that at least a portion of the fluid flow through the main passageway passes between the highly reflective surface and the window member. The main body portion may be enlarged below the sight opening as shown to insure that the flow area beneath the window member is greater than that of the main passage on either side thereof, while the small area of the pedestal member 90 and the small area presented by the edge of the disk 78 present little impedance to flow of the refrigerant in the line so that bubbles are not formed to give a false indication.

While I have shown and described certain embodiments in my invention, it is to be understood that it is capable of many modifications. Changes, therefore, in the construction and arrangement may be made without departing from the spirit and scope of the invention as disclosed in the appended claims.

I claim:

1. A sight glass unit, including: a body portion having a main flow passageway therethrough; a sight opening providing a line of view normal to the direction of flow through said main passageway, said opening communicating with said passageway; a transparent window-member closing the outer end of said sight opening and being sealed therein, the flow passageway beneath said window-member being greater in cross sectional area than that of said main passageway on either side thereof; and a highly reflective polished plane surface facing said window-member and parallel thereto but spaced therefrom so that at least a portion of the fluid flow through said passageway passes between said highly reflective surface and said window-member.

2. A sight glass unit, including: a body portion having a main flow passageway therethrough; a sight opening providing a line of view normal to the direction of flow through said main passageway, said opening communicating with said passageway and having a shoulder near the outer end thereof; an annular gasket on said shoulder; a transparent window-member disk in contact with said gasket and closing the outer end of said sight opening, the flow passageway beneath said window-member being greater in cross sectional area than that of said main passageway on either side thereof; an annular closure cap threaded onto a part of said body portion for sealing said window-member against said gasket; and a highly reflective polished plane surface facing said window-member and parallel thereto but spaced therefrom so that at least a portion of the fluid flow through said passageway passes between said highly reflective surface and said window-member.

3. A sight glass unit, including: a body portion having a main flow passageway therethrough; a sight opening providing a line of view normal to the direction of flow through said main passageway, said opening communicating with said passageway and having a shoulder near the outer end thereof; an annular gasket on said shoulder; a transparent window-member disk in contact with said gasket and closing the outer end of said sight opening, the flow passageway beneath said window-member being greater in cross sectional area than that of said main passageway on either side thereof; an annular closure cap threaded onto a part of said body portion for sealing said window-member against said gasket, the outer surface of said cap being substantially nonreflective; and a highly reflective polished surface facing said window-member but spaced therefrom so that at least a portion of the fluid flow through said passageway passes between said highly reflective surface and said window-member, said surface being provided by a piece of plated sheet metal.

4. A sight glass unit, including: a body portion having a main flow passageway therethrough; a sight opening providing a line of view normal to the direction of flow through said main passageway, said opening communicating with said passageway; a transparent window-member closing the outer end of said sight opening and being sealed therein, the flow passageway beneath said window-member being greater in cross sectional area than that of said main passageway on either side thereof; and a highly reflective polished plane surface facing said window-member and parallel thereto but spaced therefrom so that at least a portion of the fluid flow through said passageway passes between said highly reflective surface and said window-member, said surface being provided by a chromium plated disk of sheet brass.

5. A sight glass unit, including: a body portion having a main flow passageway therethrough; a sight opening providing a line of view normal to the direction of flow through said main passageway, said opening communicating with said passageway and having a shoulder near the outer end thereof; an annular gasket on said shoulder; a transparent window-member disk in contact with said gasket and closing the outer end of said sight opening, the flow area beneath said window-member being greater than that of said main passageway on either side thereof; a second annular gasket in contact with the other side of said window-member; an annular closure cap threaded onto a part of said body portion for sealing said window-member to said body portion between said gaskets, the outer surface of said cap being substantially non-reflective; a cover cap threaded onto another part of said body portion and covering said closure cap for protecting said window-member; and a highly reflective polished plane surface facing said window-member and parallel thereto but spaced therefrom so that at least a portion of the fluid flow through said passageway passes between said highly reflective surface and said window-member, said surface being provided by a piece of plated sheet metal.

6. A sight glass unit, including: a body portion having a main flow passageway therethrough; a sight opening providing a line of view into said passageway; a transparent window-member closing the outer end of said sight opening and being sealed therein, the flow passageway beneath said window-member being greater in cross sectional area than that of said main passageway on either side thereof; and a highly reflective polished plane surface facing said window-member but spaced therefrom so that at least a portion of the fluid flow through said passageway passes between said highly reflective surface and said window-member.

7. A sight glass unit, including: a body portion having a main flow passageway therethrough; a sight opening providing a line of view into said passageway; a transparent window-member closing the outer end of said sight opening and being sealed therein; and a highly reflective polished plane surface facing said window-member but spaced therefrom so that at least a portion of the fluid flow through said passageway passes between said highly reflective surface and said window-member.

8. A sight glass unit, including: a body portion having a main flow passageway therethrough; a sight opening providing a line of view into said passageway; a transparent window-member closing the outer end of said sight opening and being sealed therein, the flow passageway beneath said window-member being greater in cross sectional area than that of said main passageway on either side thereof; and a highly reflective polished surface facing said window-member but spaced therefrom so that at least a portion of the fluid flow through said passageway passes between said highly reflective surface and said window-member, said surface being provided by a piece of polished sheet metal.

9. A sight glass unit, including: a body portion having a main flow passageway therethrough; a sight opening providing a line of view normal to the direction of flow through said main passageway, said opening communicating with said passageway and having a shoulder near the outer end thereof; an annular gasket on said shoulder; a transparent window-member disk in contact with said gasket and closing the outer end of said sight opening, the flow passageway beneath said window-member being greater in cross sectional area than that of said main passageway on either side thereof; an annular closure cap threaded onto a part of said body portion for sealing said window-member against said gasket; and a highly reflective polished plane surface facing said window-member and parallel thereto but spaced therefrom only sufficient to provide said greater flow area, so that at least a portion of the fluid flow through said passageway passes between said highly reflective surface and said window-member.

10. Apparatus of the character claimed in claim 9, wherein the reflective surface is provided by a piece of plated sheet metal seated on said shoulder.

11. A sight glass unit, including: a body portion having a main flow passageway therethrough of substantial cross sectional area; a sight opening providing a line of view normal to the direction of flow through said main passageway, said opening communicating with said passageway; a transparent window-member closing the outer end of said sight opening and being sealed therein, the flow area beneath said window-member being greater than that of said main passageway on either side thereof; and a highly reflective polished plane surface facing said window-member and parallel thereto but spaced therefrom so that at least a portion of the fluid flow through said passageway passes between said highly reflective surface and said window member, said reflective surface being provided by a piece of polished sheet metal supported by a pedestal-member of relatively small cross-sectional area.

12. A sight glass unit, including: a body portion having a main flow passageway therethrough of substantial cross-sectional area; a sight opening providing a line of view into said passageway; a transparent window-member closing the outer end of said sight opening and being sealed therein; and a highly reflective polished plane surface facing said window-member but spaced therefrom so that at least a portion of the fluid flow through said passageway passes between said highly reflective surface and said window-member, said reflective surface being provided by a piece of polished sheet metal supported by a pedestal-member of relatively small cross-sectional area.

13. A sight glass unit, including: a body portion having a main flow passageway therethrough, said body portion also having a socket therein; a sight opening providing a line of view normal to the direction of flow through said main passageway; a transparent window-member closing the outer end of said sight opening and being sealed therein, the flow area beneath said window-member being greater than that of said main passageway on either side thereof; and a highly reflective polished surface facing said window-member but spaced therefrom so that at least a portion of the fluid flow through said passageway passes between said highly reflective surface and said window-member, said surface being provided by a piece of polished sheet metal recessed into said socket.

14. A sight glass unit, including: a body portion having a main flow passageway therethrough; a sight opening providing a line of view normal to the direction of flow through said main passageway; a transparent window-member closing the outer end of said sight opening and being sealed therein, the flow area beneath said window-member being greater than that of said main passageway on either side thereof; and a highly reflective polished surface facing said window-member but spaced therefrom so that at least a portion of the fluid flow through said passageway passes between said highly reflective surface and said window-member, said surface being provided by a piece of polished sheet metal recessed into said body portion in a wall of said main passageway.

15. A sight glass unit, including: a body portion having a main flow passageway therethrough; a sight opening providing a line of view normal to the direction of flow through said main passageway, said opening communicating with said passageway and having a shoulder near the outer end thereof; an annular gasket on said shoulder; a transparent window-member disk in contact with said gasket and closing the outer end of said sight opening, the flow passageway beneath said window-member being greater in cross-sectional area than that of said main passageway on either side thereof; a second annular gasket in contact with the other side of said window-member; a gasket washer on said second gasket, said washer having at least one lip adjacent the periphery of said second gasket to limit the expansion of said gasket; an annular closure cap threaded onto a part of said body portion for sealing said window-member to said body portion between said gaskets, the outer surface of said cap being substantially non-reflective; a cover cap threaded onto another part of said body portion and covering said closure cap for protecting said window-member; and a highly reflective polished plane surface facing said window-member and parallel thereto but spaced therefrom so that at least a portion of the fluid flow through said passageway passes between said highly reflective surface and said window-member, said surface being provided by a piece of plated sheet metal.

JOSEPH ASKIN.

REFERENCES CITED

The following references are of record in the file of this patent:

UNITED STATES PATENTS

| Number | Name | Date |
|---|---|---|
| 820,922 | Einsele | May 15, 1906 |
| 890,742 | Whitney | June 16, 1908 |
| 975,127 | Fuller | Nov. 8, 1910 |
| 2,109,355 | Lank | Feb. 22, 1938 |